United States Patent [19]
Lovendusky et al.

[11] 3,818,187
[45] June 18, 1974

[54] CREDIT VERIFICATION SYSTEM AND TERMINAL THEREFOR

[75] Inventors: Charles Michael Lovendusky, Enola; Raymond Vincent Pass, Camp Hill, both of Pa.

[73] Assignee: AMP Incorporated, Harrisburg, Pa.

[22] Filed: Feb. 8, 1972

[21] Appl. No.: 224,503

[52] U.S. Cl. ....... 235/61.7 B, 340/149 A, 179/2 CA
[51] Int. Cl. ........................... G06k 5/00, G06k 7/08
[58] Field of Search . 235/61.7 B, 61.11 D, 61.11 E, 235/61.11 R; 340/149 A; 194/4 R; 179/2 CA, 6.3 CC, 2 DP, 100.2 CA

[56] References Cited
UNITED STATES PATENTS

| | | | |
|---|---|---|---|
| 2,600,817 | 6/1952 | Victoreen | 235/61.11 E |
| 2,864,892 | 12/1958 | Perkins | 179/100.2 CA |
| 3,069,496 | 12/1962 | Blinken et al. | 235/61.11 D |
| 3,308,238 | 3/1967 | Brothman et al. | 235/61.7 B X |
| 3,394,246 | 7/1968 | Goldman | 235/61.7 B |
| 3,564,210 | 2/1971 | Presti | 235/61.7 B |
| 3,617,638 | 11/1971 | Jochimsen et al. | 235/61.7 B |
| 3,651,310 | 3/1972 | Link | 340/149 A |
| 3,653,323 | 4/1972 | McGowan et al. | 235/61.11 E X |
| 3,655,946 | 4/1972 | Morita et al. | 235/61.11 D |
| 3,671,717 | 6/1972 | Bieser | 235/61.7 B |
| 3,696,335 | 10/1972 | Lemelson | 235/61.7 B X |
| 3,721,128 | 3/1973 | Thurman | 340/149 A |

Primary Examiner—Thomas J. Sloyan
Attorney, Agent, or Firm—Gerald K. Kita

[57] ABSTRACT

A system for verifying the credit status of individual consumers is disclosed, along with a terminal structure for facilitating point of sale credit checks. The system includes a central processing unit which is coupled through suitable communication channels to a plurality of remotely located terminals. Each terminal includes an apparatus for holding a credit card and for reading information imprinted thereon and a printing mechanism for printing identification and purchase information on an appropriate business form. The terminal also includes a price register in which the amount of a particular proposed credit sale is set. A logic network is provided to lock the printer and the price register while identifying information contained on the credit card is transmitted to the central processing unit. The central processing unit then determines whether the holder of the credit card is entitled to credit in the amount of the proposed sale, and then transmits the appropriate information to the point of sale terminal. The information signal unlocks the printer, thus permitting printing of the business form. Variations of the basic device are also disclosed, such as a device for preventing the return of fraudulent or expired credit cards.

9 Claims, 7 Drawing Figures

3,818,187

CREDIT VERIFICATION SYSTEM AND TERMINAL THEREFOR

BACKGROUND OF THE INVENTION

1. Field of the Invention

This invention relates generally to verification systems, and more particularly to a system and terminal structure for verifying credit for credit card purchases.

2. Description of the Prior Art

As credit and credit card purchasing continues to expand, the problems associated with it have also grown phenomenally, resulting in large economic losses in many cases. For example, numerous situations occur daily in which fraudulently obtained credit cards are used to make purchases. In addition, expired credit cards are often used, sometimes in good faith, to make purchases for which credit is not actually authorized. However, many problems of a much more subtle nature also exist. For example, many credit granting institutions limit the extent of the credit of individual card holders. However, without checking the central files of the credit granting association, individual merchants can not at present determine whether an individual has in fact exceeded his authorized credit limit.

Other similar problems exist due to the fact that at present merchants can not conduct an immediate check of the credit status of individuals at the time when they are about to make credit purchases. Accordingly, a need exists for a system for rapidly and conveniently checking the credit status of potential purchasers at the point of sale.

Although some credit checking systems have been proposed in the past, they have not been of a practical nature in view of the fact that the point of sale terminal structures which they include are either too expensive, too complicated or too limited in some other feature to make practical their commercial use. Consequently, there is a need for a new type of terminal structure to be associated with a practical credit checking or verification system.

SUMMARY OF THE INVENTION

Accordingly, one object of this invention is to provide a novel credit checking and verification system.

Another object of this invention is to provide a novel system for verifying credit card purchases at the point of sale.

Yet another object of this invention is to provide a novel terminal structure for use with a credit verification system.

A still further object of this invention is to provide a terminal structure for use with a credit verification system having a novel credit card transporting system.

Yet another object of this invention is to provide a novel terminal structure for use with a credit verification system having a novel card transporting and reading system.

Yet another object of this invention is to provide a novel business form holding assembly for use with a terminal structure intended to be coupled to a credit verification system.

Another object of this invention is to provide a novel read head mounting structure for use with a credit verification system terminal.

Briefly, these and other objects of the invention are achieved by providing a central processing unit coupled through appropriate communication channels to a plurality of remote terminals. Each terminal includes a credit card transporting and reading assembly and a business form holding apparatus. A printer is also included to print selected data on the business form. Each terminal further includes a locking system for preventing actuation of the printer until appropriate credit verification information has been received from the central processing unit. Each terminal also includes a price register which may be locked or unlocked depending upon reception of appropriate signals from the central processing unit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
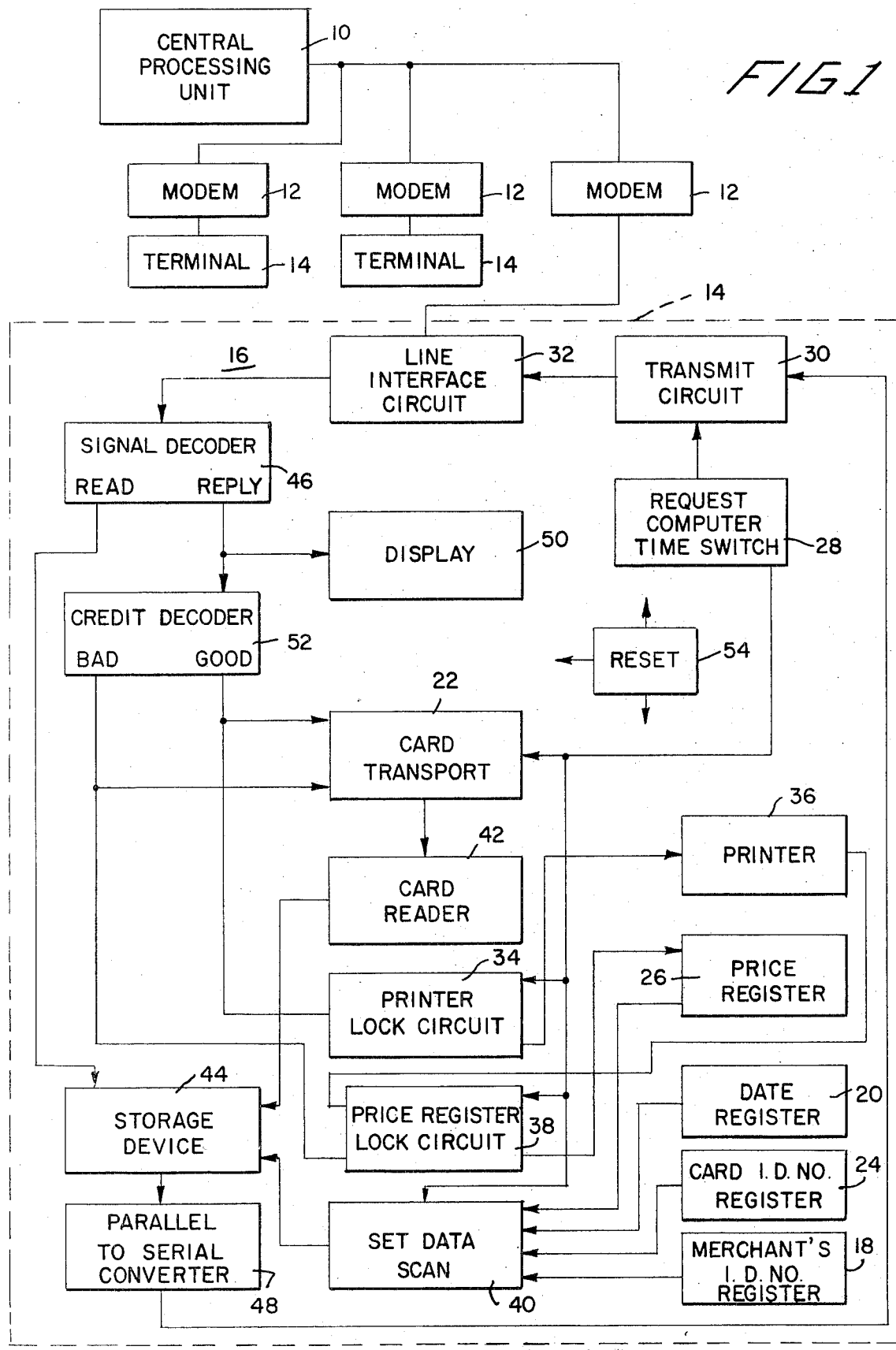
FIG. 1 is a block diagram of one embodiment of the credit verification system of the instant invention.

Referring now to the drawings wherein like reference numerals designate identical or corresponding parts throughout the several views and, more particularly to FIG. 1 thereof, one embodiment of the overall credit verification system of the present invention is illustrated in the form of a block diagram. As illustrated, a central processing unit 10 forms the heart of the credit checking and verification system. The central processing unit 10 may be a digital computer, for example, or a complete computing and accounting center. The central processing unit (CPU) is coupled through a plurality of modems 12 to a plurality of terminals 14. Each terminal 14 is preferably located at a point of sale or in the vicinity of the place at which credit sales are intended to occur. The central processing unit 10 may be located at any remote distance from the terminals 14, and is coupled to them through the modems 12 in such a manner as to permit two-way communications.

A first embodiment of a particular terminal network is illustrated at 16 in FIG. 1. The terminal 16 includes a plurality of manually settable data registering devices. For example, a merchants' identification number register 18 is provided to identify the merchant or location of the terminal 16. This device may consist either of a manually settable numerical register, or it may simply be a form of card or code reader into which an identifying numeral or code is inserted. A date register 20 is also provided for indicating the data on which a particular transaction takes place. Similarly, a timer or timing register could be added to the system for indicating the exact time at which a particular transaction took place. However, no timer is specifically illustrated in FIG. 1. A card transport mechanism 22 is provided and is designed to receive a credit or identification card, preferably of the conventional size and shape. Once a potential purchaser has produced a credit or identification card, it is inserted in a card transport 22, and the type or issuer of the card is registered in an I.D. card number register 24. Again, the I.D. card number register 24 may be a manually operated register in which a code number is entered which represents the issuer of the credit card, or the credit granting institution through which the credit sale is to be charged. A price register 26 is also provided for indicating the amount of a proposed purchase. Again, this device preferably consists of a manually settable register which is set by a clerk or operator to the amount of the proposed sale.

An actuating switch 28 is provided for coupling the terminal network 16 to the central processing unit 10. By actuating the switch 28, an operator indicates to the central processing unit that a particular terminal is requesting a credit verification. Thus, by actuating the switch 28, an operator effectively requests computer time.

The request time switch 28 is coupled through a transmit circuit 30 to a line interface circuit 32, which couples the terminal 14 to the modem 12, and thus to the central processing unit 10.

In the terminal embodiment illustrated in FIG. 1, actuation of the request computer time switch 28 causes several functions to occur within the terminal 14 at the same instant that a request signal is sent to the CPU 10. More particularly, the request computer time switch 28 is coupled to the card transport 22, a printer lock circuit 34, a price register lock circuit 38, and a set data scanner 40. The signal from the switch 28 activates the card transport 22 which transports the credit card past a card reader 42. The card reader 42 reads the identifying indicia present on the card, which may be in the form of either a magnetic record fixed to the card, or conventional embossed lettering. In either case, the card reader senses the appropriate information on the customer's credit card and feeds it to a suitable storage device 44. The storage device 44 may consist of a shift register, a magnetic storage network, or any other suitable type of memory system. Similarly, the signal from the switch 28 activates the printer lock circuit 34, which locks a printer 36 in an inoperable position. The lock circuit 34 may, for example, include a solenoid for locking the printer in position. The printer 36 may, for example, consist of a conventional Farrington Printer (Trademark) having a manually operated slider which presses a conventional business form against raised printing characters. The solenoid included in the printer lock circuit may thus include a latch for holding the manually operable printing slider, thereby preventing the printing operation.

The signal from the switch 28 also actuates the price register lock circuit 38, which locks the price register 26 in the position to which it has been set. Thus, after the price register 26 is manually set to the amount of the desired sale, actuation of the switch 28 causes the lock circuit to fix the reading of the price register 26. The price register 26 cannot be adjusted after the switch 28 has been activated. The price register lock circuit may include a plurality of solenoids, a mechanical clutch network, or any other equivalent type of device which prevents the price register from being adjusted.

Finally, the output from the switch 28 activates the set data scanner 40, which is coupled to the merchants' I.D. number register 18, the date register 20, the card I.D. number register 24, the price register 26, and the storage device 44. The set data scanner, when activated, reads the information in the registers 18, 20, 24 and 26, and feeds it to the storage device 44 for retention therein. As an alternative structure to that shown in FIG. 1, a merchants' I.D. number register may be eliminated, and replaced by a fixed code set into the set data scanner 40, or the storage device 44. The same type of fixed code may be used instead of the card I.D. number register 24, provided only one particular type of card is to be used (i.e., the fixed code applies to all cards to be used at a particular terminal).

Thus, after the request computer time switch 28 has been activated, data representing the identification of a prospective purchaser (i.e., data stored on a prospective purchaser's credit card), the amount or price of a prospective purchase, the data of the purchase, the type of credit card being used, and the merchant making the sale or the location at which the sale is to be made are all read into a suitable storage device, and the central processing unit 10 is notified that this data has now been read into the storage device. The central processing unit 10 may include a scanning network, for example, which periodically scans each of the terminals 14 to determine which, if any, of them have data to transmit. Once it is determined that a particular terminal has data to transmit, the central processing unit 10 transmits a read or pole signal to the terminal requesting computer time. This read signal is received by the line interface circuit 32 of the terminal 14, and is fed to a signal decoder 46. The signal decoder 46 discriminates between poling signals from the computer, and reply or credit verification signals. When a read or poling signal is detected by the signal decoder 46, it is fed to the storage device 44 causing the data in the storage device to be dumped or read out. If the storage device is of a parallel output type, a parallel-to-serial converter 48 may be coupled to it in order that the output data of the terminal may be transmitted in serial form. The output data is fed from the storage device 44, through the optional parallel-to-serial converter 48 to the transmit circuit 30. The transmit circuit 30 applies the information to the line interface circuit 32, which feeds it to the modem 12 and to the central processing unit 10.

The central processing unit 10 then identifies the account of the credit card holder and determines whether his credit is good in the amount indicated for the proposed sale. After the central processing unit 10 determines the status of the card holder's credit, it sends back a reply signal to the terminal 14. This signal is received by the line interface circuit 32, and passed to the signal decoder 46, where it is determined to be a reply signal. The reply signal is then fed to a display unit 50 which visually indicates to the merchant or attendant at the point of sale the status of the prospective purchaser's credit. The same signal is fed to a credit decoder 52 which determines whether the computer reply indicates that the prospective purchaser's credit is good or bad for the amount of the proposed sale. If the credit decoder 52 senses that the prospective buyer's credit is good, it triggers the card transport mechanism 22 to return the card to its owner. It should be noted that the initial actuation of the switch 28 causes the transport mechanism to operate in only one direction. That is, the transport mechanism initially moves the card from the position at which it was inserted into the mechanism to an enclosed position from which it cannot be retrieved, until the transport mechanism is reversed. A good credit signal from the credit decoder 52 causes such a reversal of the transport mechanism 22, so that the card can be retrieved by its owner.

The good credit signal is also coupled to the printer lock circuit 34, and serves to unlock the printer. Thus, the merchant or attendant can now operate the printer, to print an appropriate business form, and thus conclude the sale. Actuation of the printer 36 causes a release of the price register lock circuit, so that the price register 26 is released and the terminal 14 is ready for subsequent sales.

However, if the computer reply is a bad credit signal, the credit decoder 52 generates a bad credit output signal. This signal is applied to the transport mechanism 22, which may perform either of two functions, depending upon the nature of the bad credit signal. If the computer indicates that the amount of available credit is not sufficient for the amount of the sale, but that the card is valid, the bad credit signal may simply reverse the card transport mechanism 22, returning the card to its owner while the display indicates insufficient credit. The printer is not unlocked, however. On the other hand, if the computer indicates that the credit card has been stolen, has expired, or is fraudulent or invalid, the card transport mechanism may be activated to drop the card into a permanent retention bin, or to otherwise deface or destroy the card. In this manner, fraudulent, expired or invalid cards may be removed from circulation.

The bad credit output of the credit decoder 52 is also coupled to the price register lock circuit 38, and serves to release the price register lock. Thus, if a bad credit signal is received from the central process unit 10, the price register is immediately unlocked. If the card is not fraudulent, the card will also be returned as the price register is unlocked. This permits the operator or merchant to set a lower proposed sale price into the price register and to repeat the card reading operation, in order to determine if the prospective purchaser has credit for a lower amount than the initial sale. This process can thus be continued until it is determined what amount of credit is possessed by the prospective purchaser, if so desired. Thus, if it is found that the credit card holder has a lower amount of credit than that required for the initial sale, it may be determined that he can have a lower amount of credit, and thus be required to pay the remaining portion of the sale price in cash. Obviously, many other techniques for using this system may be developed in view of the great flexibility thereof.

It should be noted that since the amount of each transaction is transmitted to the central processing unit 10, the central processing unit can maintain an up to date record of all changes placed against a particular credit account. Thus, the credit verification system of the present invention provides an immediate accounting system which prevents a particular individual from using more credit than he is entitled to. The central processing unit 10, can also, therefore, be used to prepare billing statements, and so forth, on a virtually instantaneous basis, if so desired.

A reset switch 54 is provided, which may be coupled to the storage device 44, and to the various locking circuits, etc. to manually reset the terminal 14 for the next transaction. It will be realized, of course, that an automatic resetting system may be included instead of a manual one, to permit automatic resetting of the terminal on the basis of signals received from the central processing unit 10.

Figure 2:
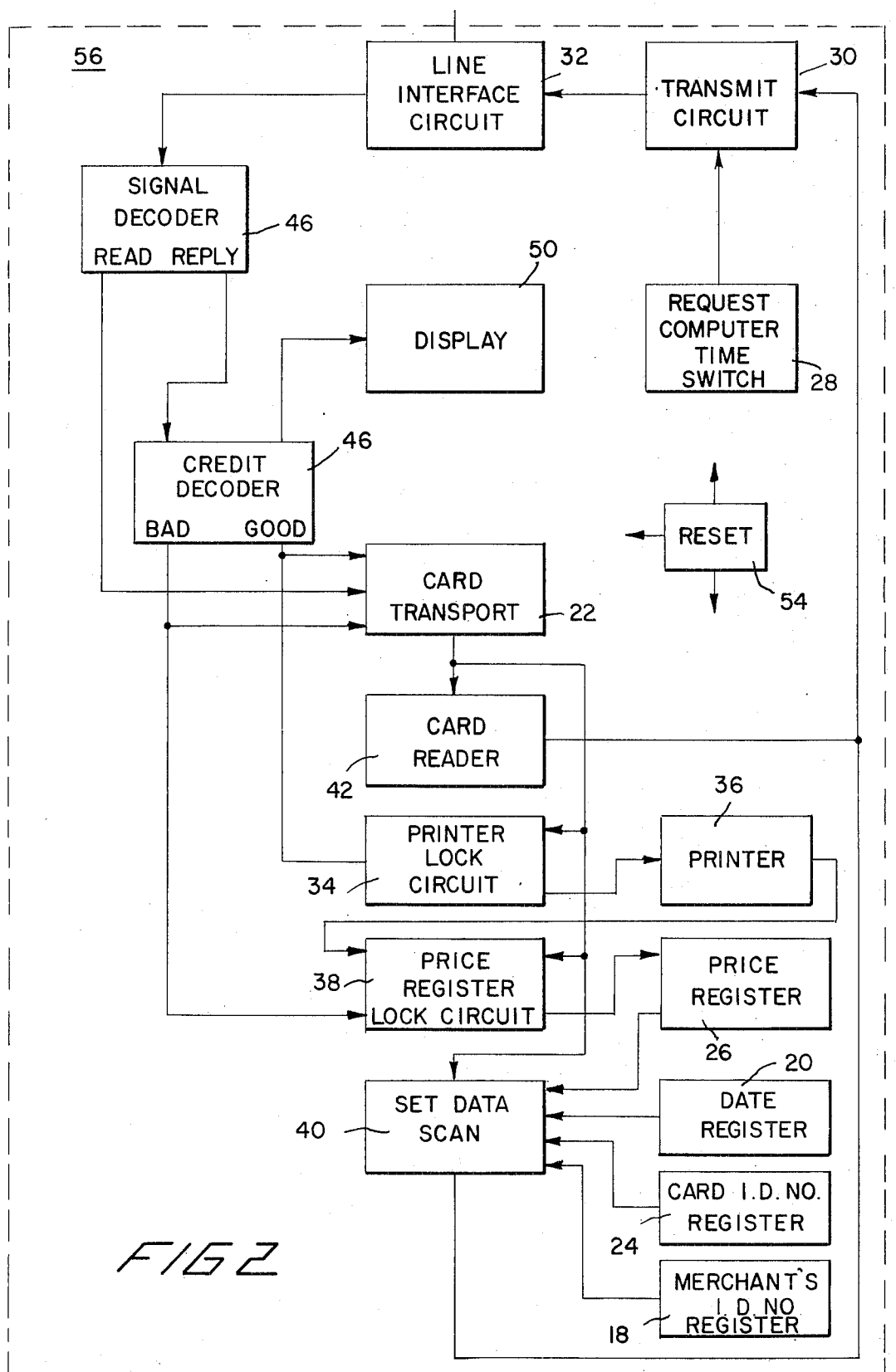
FIG. 2 is a block diagram of a second embodiment of the terminal logic network illustrated in FIG. 1.

Referring now to FIG. 2, a second terminal logic embodiment is illustrated in block diagram form. The terminal embodiment illustrated in FIG. 2 is somewhat simpler, and more economical to construct, than that illustrated in FIG. 1, since the storage device 44 is eliminated. However, the system of FIG. 2 operates at a somewhat lower speed than that illustrated in FIG. 1, due to a slower readout speed, and accordingly requires more central processing unit time. However, if central processing unit time is not a major factor, as where a relatively small number of terminal devices are coupled to the central processing unit, or where individual terminals are not frequently used, this embodiment is highly suitable.

The interconnection scheme of the terminal logic network illustrated in FIG. 2 is somewhat different than that illustrated in FIG. 1. The operation of the merchants' I.D. number register 18, the date register 20, the card I.D. number register 24 and the price register 26 are identical to the operations disclosed with respect to the embodiment of FIG. 1. However, in the embodiment of FIG. 2, the request computer time switch 28 is coupled only to the transmit circuit 30. Thus, actuation of the switch 28 simply signifies to the central processing unit 10 that time is required by the terminal structure 56. Thus, actuation of the switch 28 does not operate the card transport or the set data scan 40. Accordingly, nothing happens within the terminal structure 56 until a read or poling signal is received from the central processing unit 10.

The read signal is again received by the line interface circuit 32 and fed to the signal decoder 46. However, after the signal decoder determines that a read signal has arrived, a read output is applied to the card transport 22. This causes the card transport 22 to be activated for one-way operation. Thus the credit or identification card is transported from its initial position to the inaccessible reading position within the transport mechanism 22. Activation of the card transport 22 triggers the set data scan 40, which scans the information stored in the merchants' I.D. register 18, the card I.D. register 24, the date register 20 and the price register 26. This information is simultaneously fed to the transmit circuit 30 and thus to the CPU 10 as it is scanned by the set data scan 40. The delay time required by the card transport mechanism 22 to carry the card through the card reader 42 provides a time interval sufficient to permit the data scan 40 to transmit the data contained in all the various registers. The timing of these systems is purposely adjusted to provide this desirable interval. Thus as soon as the data scan 40 has completed reading out the data set into the registers, the card is in position to begin passing the card reader 42. Again, as the data stored on the credit card is read by the card reader 42, the card data is immediately fed to the transmitted circuit 30 and thus to the CPU 10.

It should be noted that activation of the card transport mechanism 22 also actuates the printer lock and price register lock circuits to lock the printer and price register as soon as the transport mechanism begins to operate. Thus, the effective operation of the embodiment illustrated in FIG. 2 is substantially the same as that illustrated in FIG. 1, although the data is read out during an interval which is effectively determined by the length of time required for the card transport mechanism to transport the card from an initial position to a final position, during the course of which it is transported past the card reader. This interval is substantially slower than the interval required to read out the storage device 44 of the FIG. 1 embodiment, and to convert the data from parallel form to serial form.

The operation of the terminal logic network illustrated in FIG. 2 to all responses or reply signals from the central processing unit 10 is identical to the operation of the embodiment illustrated in FIG. 1. Accordingly, the description of the response of the circuit to reply signals from the CPU 10 will not be repeated.

Figure 3:
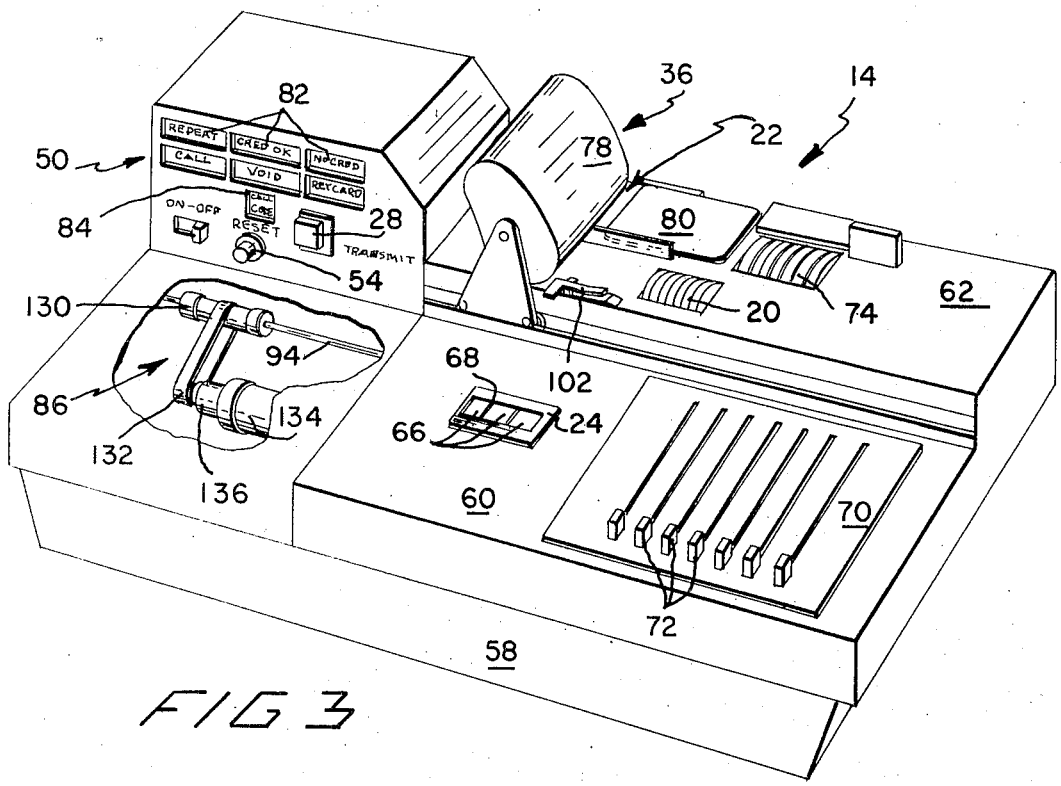
FIG. 3 is a partially cutaway perspective illustration of a terminal apparatus intended to be used with the system illustrated in FIG. 1.

Referring now to FIG. 3, the preferred physical structure for each terminal 14 is illustrated. The structure includes a housing 58 having a top panel 60 to which a raised printer base 62 is secured. This figure illustrates physical embodiments for the data register 20, card I.D. register 24, price register 26, request computer time or transmit switch 28, printer 36, display 50 and reset switch 54.

As described previously, the date register may include a plurality of number wheels 64 having raised type or printing numerals thereon. The number wheels may be manually rotatable to set a prescribed date into the register. An electrical readout is also provided to indicate to the systems illustrated in FIGS. 1 and 2 the date set into the register. Similarly, the card I.D. number register 24 is shown as including a plurality of number wheels 66 which are set by means of an equivalent plurality of manually movable knobs 68 attached to the number wheels 66. Again, electrical outputs are provided to indicate the number set into the card I.D. number register 24.

The price register 26 is illustrated as including a panel 70 having a plurality of number setting slide levers 72 movably mounted therein. A plurality of print wheels 74 are mechanically coupled to the number setting slide levers 72. Thus, by adjusting the position of the number setting slide levers 72, the print wheels 74 are rotated. Each of the print wheels carries a plurality of raised print characters 76 (see FIG. 4) for printing the price information on a suitable business form. Again, suitable electrical outputs are provided to read out the price information set into the price register. The specific structure of the electrical readout assembly is disclosed in more detail in a copending application, Ser. No. 32,150, filed Apr. 27, 1970, and now abandoned, and assigned to the same assignee as the present application.

The printer assembly 36 includes a manually movable member 78 which is movable along a suitable track on rollers. The specific structure of this device is disclosed more fully in U.S. Pats. No. 2,606,494; 2,620,729; 2,620,730; 2,935,596; 3,358,597; 3,388,659 and 3,388,660, assigned to the Farrington Business Machines Corporation. As is disclosed in these patents, a credit card 80 is positioned on the printer in the path of the printer member 78. A suitable business form, not shown, is also placed in the path of the printer member 78. The business form covers at least a portion of the card 80, as well as the print wheels 64 and 74. Thus, by manually moving the printer member 78 over the business form, certain information printed on the credit card 80 in the form of embossed characters, as well as the numbers set into the registers 20 and 26 are printed on the business form. The present invention is also adaptable for motorized operation of the printer member 76 over the business form.

The display 50 is illustrated as including a plurality of windows 82, each of which is comprised of a transparent panel on which an information bearing code, such as a word, is imprinted. Behind each of the windows 82 are selectively energizable lights (not shown). Thus, upon receipt of proper incoming information signals from the central processing unit 10 selected ones of the lights are energized, thereby emphasizing the message printed on one of the windows 82. As shown in the drawings, the windows 82 may carry a variety of messages. For example, the windows may carry a "repeat" signal indicating that the CPU has not received a proper reading, and that the reset button should be pressed so that the entire credit card reading operation can be repeated. Next, the windows 82 include messages indicating that credit is good or, alternatively, that there is no credit. In addition, if the computer senses a particular problem that is not appropriately coded in the display, a "call" signal is fed to the display. In addition, a separate window 84 is provided in which a particular "call code" is registered. The call code may consist, for example, of a one or more digit number indicating to the terminal operator that a specific number is to be telephoned for further information. The windows 82 may also carry a "void" message, indicating that the credit card being read is void or in some way invalid. This may be associated with the portion of the transport mechanism 22 which prevents return of a card, or causes the card to be destroyed. Finally, a "return card" message may be printed on the windows 82. This message indicates that a credit card is valid and that it should be returned to its owner. Obviously, numerous additional types of messages could be included on the windows 82. In addition, other types of readout structures could be used in place of the windows backed by selectively energizable lights, as will be appreciated by those skilled in the art.

A drive mechanism 86 for operating the card transport 22 is enclosed within the housing 58. The drive mechanism 86 is shown in greater detail in FIGS. 6 and 7.

Figure 4:
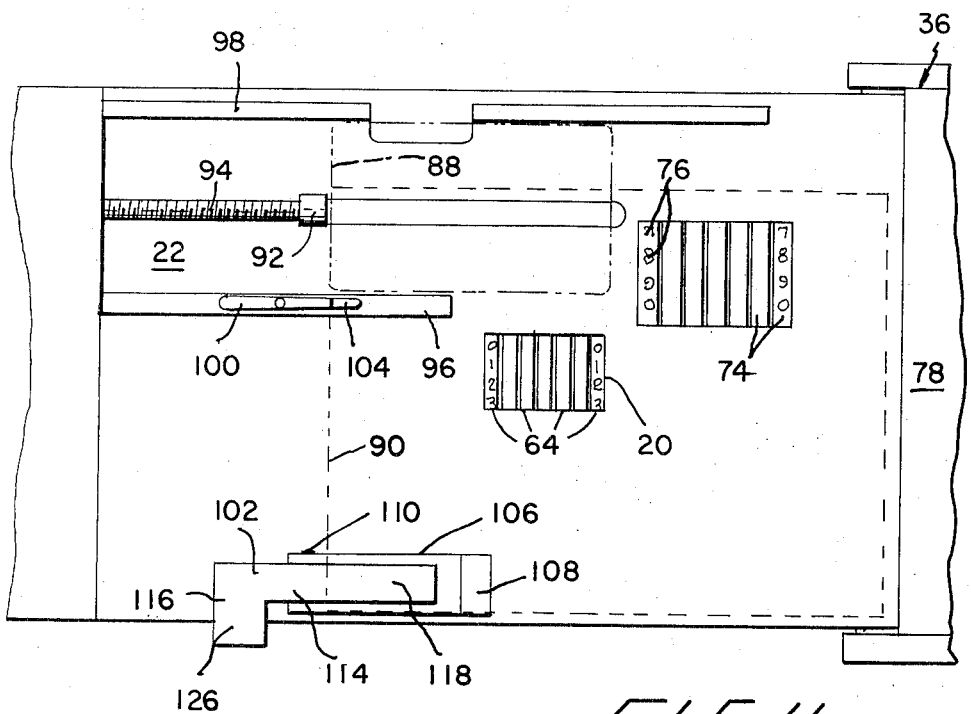
FIG. 4 is a plan view of a portion of the terminal apparatus illustrated in FIG. 3.

Referring now to FIG. 4, the raised printer base 62 is illustrated in greater detail, showing more clearly the various structural elements mounted thereon. In FIG. 4, a dashed line 88 indicates the position in which the credit card 80 is to be placed on the transport mechanism 22. Similarly, a dashed line 90 indicates the position in which a business form may be placed on the transport and printing mechanism. As shown by the dashed line 90, the business form covers at least a portion of the credit card 80, as well as the print wheels 64 and 74.

The card transport mechanism 22 includes a card holder 92 having raised portions at either end for engaging the card 80. The card holder 92 is driven by a threaded drive member 94 included in the drive mechanism 86, as will be described in greater detail hereinafter. A spring loaded guide bar 96 is provided along one side of the card transport mechanism 22 to ensure that the card 80 remains firmly engaged with the transport mechanism 22. A card receiving slot may be provided in one edge of the spring loaded guide bar 96 for receiving one edge of the card 80. Similarly, an equivalent slot may be provided on the opposite side of the transport mechanism 22 in a fixed guide bar 98. Finally, a pair of business form holders 100 and 102 are mounted to the raised printer base 62 in order to hold the business form in place as the movable printer member 78 is operated. The first business form holder 100 may simply comprise an elongated resilient metal strip having an upturned end portion 104 to permit one end portion of the business form to be inserted form holder 100 the resilient metal strip is forced down against the business form, holding it in place.

Figure 5:
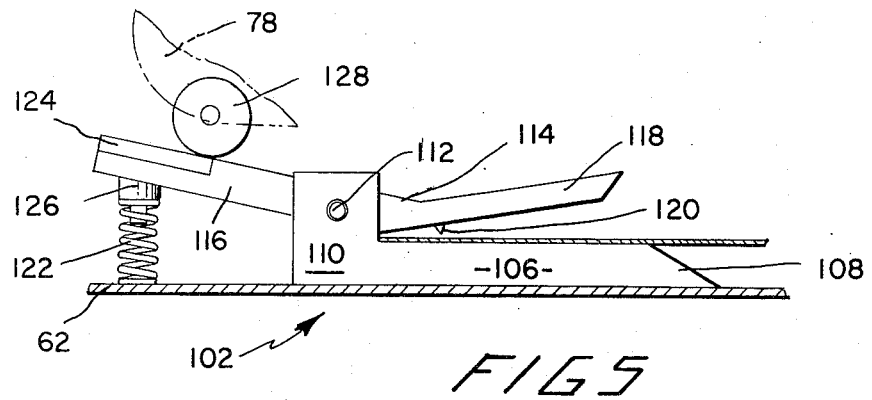
FIG. 5 is a side view of a portion of the business form holder illustrated in FIG. 4.

The structure of the second business form holder 102 is illustrated more clearly in FIG. 5. As shown, the second business form holder 102 includes a base portion 106 having a ramp spaced forward edge 108 and a raised arm 110 at the rear portion, including a bearing aperture 112. A clamp 114 is rotatably mounted in the bearing aperture 112. The clamp 114 includes two arm portions, 116 and 118 which are joined together forming an obtuse angle. A stud 120 is provided in the lower portion of the arm 118 to engage the business form when it is inserted into the business form holder 102. A coil spring 122 is mounted between the surface of the raised printer base 62 and a suitable mounting fixture 124 positioned on the lower side of the arm 116 for biasing the clamp structure 114 such that it normally forces the stud 120 into engagement with the business form. A wing 126 is coupled to one end of the arm 116 to provide a camming surface for cooperating with the movable printer member 78. Thus, when the movable printer member 78 is moved back along its trackway, a cam member 128 mounted thereon engages the wing 126, rotating the clamp 114 against the force of spring 122. This action releases the stud 120 from the business form, permitting the business form to be removed. However, when the movable printer member 78 is moved toward the vicinity of the print wheels 64 and 74, the stud 120 engages the business form, holding it rigidly in position, and preventing it from moving while the printing operation is in progress.

Figure 6:
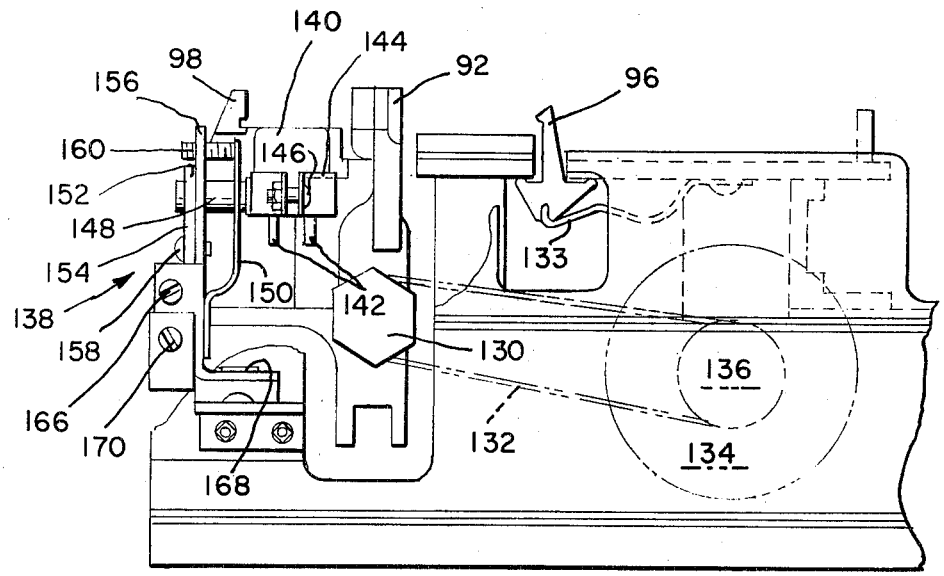
FIG. 6 is an end view of the drive mechanism and read head mounting assembly of the terminal apparatus illustrated in FIG. 3; and, FIG. 7 is a side view of the drive mechanism and head mounting assembly illustrated in FIG. 6.
Figure 7:
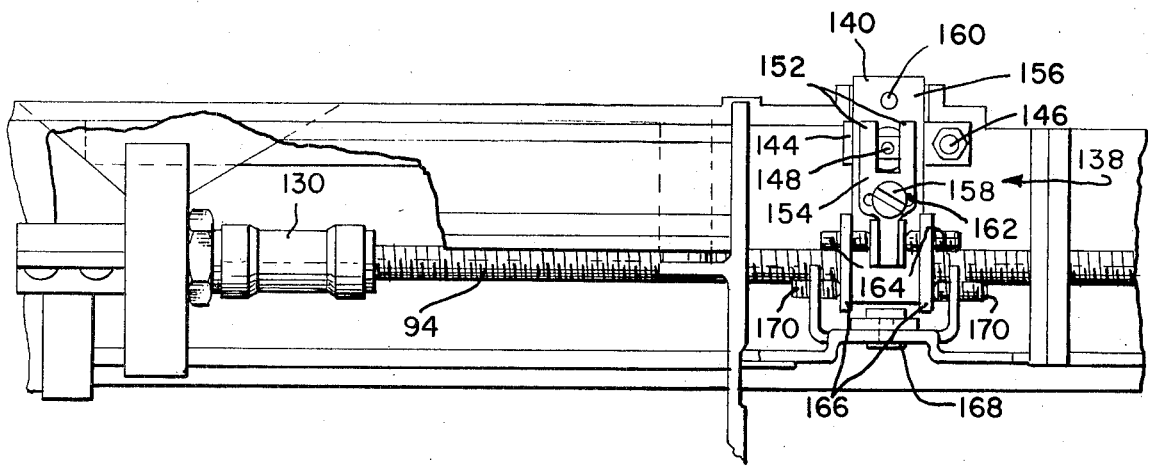

Referring now to FIGS. 6 and 7, the drive mechanism 86 is shown in greater detail. The drive mechanism includes the threaded drive member 94, to which a suitable drive pulley 130 is mounted. The drive pulley and threaded drive member assembly may be obtained commercially, and is known as a "ROTON" 250P Positive Drive Actuator (Trademark) manufactured by the Anderson Company. The drive pulley 130 is coupled by means of a suitable drive belt 132 to a synchronous motor 134. An overrunning clutch 136 may be used to couple the drive belt 132 to the motor 134. In operation, the motor 134 drives the pulley 130 through the belt 132. The pulley 130 causes the threaded drive member 94 to rotate, causing longitudinal movement of the card holder 92.

As shown in FIG. 6, the spring loaded guide bar 96 may be biased into position by means of a suitable leaf spring 133.

FIGS. 6 and 7 also illustrate the details of the card reader head mounting assembly, designated generally in the drawings by the numeral 138. The card reader head mounting assembly carries a reading head 140 which may be a magnetic head, for example, or some other type of information reading head. This head must be adjustable in all directions, to permit proper alignment with the information bearing portion of the credit card 80. Accordingly, the mounting assembly 138 must provide for a variety of adjustments.

The reading head 140 includes depending plugs or prongs 142 from which output information signals may be taken. The head 140 is held in a C-shaped collar 144, the free ends of which are secured together by means of a bolt or screw 146. It should be noted that the collar 144 need not be precisely C-shaped, but it must conform to the general circumferential shape of the read head 140. Tightening of the bolt 146 holds the read head in a fixed position. However, the bolt 146 may be loosened to raise or lower the head 140, thus permitting adjustments along a vertical axis. The collar 144 includes a supporting arm 148 for mounting the collar and head assembly. The supporting arm 148 is rotatably mounted in a gripping aperture in a resilient or leaf spring upright member 150 and is slidably held between two pronged portions 152 of a Y-shaped structural member 154. Thus, the arm 148 is rotatably but not slidably mounted in the upright member 150, while it is slidably but not rotatably mounted in the structural member 154. The Y-shaped structural member 154 is mounted by means of a screw 158 to an intermediate structural member 156. The arrangement of the structural members is such that the intermediate structural member 156 is positioned between the Y-shaped structural member 154 and the upright member 150. An adjusting screw 160 passes through a threaded aperture in the upper portion of intermediate structural member 156 to engage an upper portion of the upright member 150. Adjustment of the screw 160 causes the resilient upright member 150 to bend, thereby adjusting the position of the head 140 to the right or left, in the illustration of FIG. 6.

The screw 158 which mounts the Y-shaped structure member 154 to the intermediate structural member 156 passes through an elongated slot 162, which permits a lateral or actuate motion, as shown in FIG. 7. A pair of adjusting screws 164 which are positioned on either side of the Y-shaped structural member 154 permit rotational adjustment or motion of this member about an axis through the center of the arm 148. The adjusting screws 164 are threaded through wing portions 166 attached to the intermediate structural member 156.

The structural member 156 is pivotally mounted to the base or framework of the housing 158 by a pivot pin or rivet 168. A pair of adjusting screws 170, which are threaded through ear portions coupled to the framework of the housing 158, abut against the wing portions 166 of the intermediate structural member 156. Rotation of the adjusting screws 170 causes the intermediate structural member 156 to pivot about an axis through the pivot pin 168.

As will be immediately apparent to those skilled in the art, the various adjusting means provided in the head mounting assembly as described above, permit adjustment of the reading head 140 in all possible directions. That is, adjustments are provided for vertical motion, horizontal motion, and various rotary motions to position the read head appropriately with respect to the information bearing card or record to be read.

Accordingly, a credit verification system has been disclosed, along with a terminal structure for use with the credit verification system. Several significant features of the terminal structure such as the card transport mechanism, the business form holding assembly and the read head mounting assembly have also been described in detail.

Obviously, numerous additional modifications and variations of the present invention are possible in light of the above teachings. It is therefore to be understood that within the scope of the appended claims, the invention may be practiced otherwise than is specifically described herein.

What is claimed as new and desired to be secured by letters patent of the United States is:

1. A credit verification system comprising:
   a central processing unit; and
   a plurality of terminal means coupled to said central processing unit, each terminal means including:
   means for registering a credit card identification number that represents the issuer of said credit card;
   means for registering the price of a transaction;
   printing means slidably moveable over said credit card and a business form along a predetermined track for causing embossed characters on said credit card and on said price register means to be printed on said business form, said printing means including means for preventing operation thereof until appropriate signals are transmitted by said central processing unit, said credit card being in a stationary first position during the operation of said printing means;
   reader means for detecting magnetic information contained on said credit card;
   transport means for positioning said credit card in said stationary first position and transporting it to said reader means from which position said card is manually inaccessible, said transport means including card holding means, threaded drive means for moving said card past said reader means, and an electric motor coupled to said threaded drive means, said transport means further including means for preventing reuse of selected credit cards activated by appropriate signals from said central processing unit; and
   control means responsive to output signals from said central processing unit for controlling the operation of said means included in said terminal means, said control means including register locking means for preventing the resetting of said price register means until said appropriate signals are transmitted by said central processing unit or until signals signifying credit disapproval at said price are transmitted by said central processing unit thereby permitting another attempt at credit verification at a different price.

2. A credit verification system as in claim 1, wherein:
   each terminal means further includes means for registering the date of a transaction.

3. A credit verification system as in claim 2, wherein:
   each terminal means further includes means for registering a merchant's identification number.

4. A credit verification system as in claim 3, wherein:
   each terminal means further includes display means for visually displaying the significance of signals transmitted by said central processing unit.

5. A credit verification system as in claim 4, wherein:
   each terminal means further includes mechanical clamping means for holding a business form in position during a printing operation.

6. A credit verification system as in claim 5, wherein:

said reader means includes a reading head; and
   a reading head mount for supporting said reading head, said reading head mount including means for adjusting the position thereof in all directions.

7. A terminal structure, comprising:
   a housing,
   manually operable printing means moveable from an initial position to a final position mounted to said housing;
   reader means for detecting information contained on a credit card;
   credit card receiving means mounted to said housing;

said credit card receiving means including card guide means comprising a slotted, movable, spring-biased guide bar, and a motor driven card transport assembly including a card carrying element, threaded drive means coupled to said card carrying element, and an electric motor coupled through a clutch to said threaded drive means, for transporting said credit card to said reader means from a position adjacent said initial position of said printing means;
   manually operable register means mounted on said housing for indicating the amount of a business transaction;
   business form holding means mounted on said housing;
   date register means for indicating the date of a transaction;
   means for registering a credit card identification number that represents the issuer of said credit card; and
   means for registering a merchant's identification number.

8. A terminal structure as in claim 7, wherein:
   said business form holding means comprises first and second resilient clamping means, said first clamping means including a resilient metal strip, said second clamping means including a base, an arm pivotally coupled to said base, said arm carrying a business form engaging stud, a spring which biases said arm so as to urge said stud toward said housing, and wherein said arm includes a cam surface adapted to engage a portion of said manually operable printing means for urging said stud away from said housing.

9. A credit verification system, which comprises:
   a central processing unit for selectively transmitting electrical signals including a read signal, a bad credit signal, a good credit signal, and a bad card signal, in response to stored credit information concerning the particular credit account under consideration;

a plurality of terminal means coupled to said central processing unit for receiving said electrical signals, each of said terminal means including:

register means for displaying and storing manually settable information therein including price register means and means for registering a credit card identification number that represents the issuer of said credit card;

data scanning means for reading the information in said register means and for feeding said information to an intermediate storage means wherefrom said information is fed to said central processing unit upon receipt of said read signal;

printing means for causing information from said credit card and from various of said register means to be printed on a sales slip;

reader means for detecting magnetic information contained on said credit card and for feeding said information to said intermediate storage means;

transport means for receiving said credit card and transporting it to said reader means from which position said card is manually inaccessible;

register locking means for preventing manual intervention with said price register means;

printing locking means for preventing operation of said printing means;

switching means for requesting access to said central processing unit which also simultaneously activates said transport means, said register locking means, said data scanning means and said printing locking means, and credit decoding means for receiving said signals from said central processing unit, and upon the receipt of either said good credit signal or said bad credit signal, for causing said transport means to transport said credit card back to its originally manually accessible position and further, only upon the receipt of said good credit signal, for releasing said printing locking means to permit the normal operation thereof and, upon the receipt of said bad card signal, for causing said transport means to retain said card within said terminal means whereby said bad card is removed from circulation.

* * * * *